Nov. 2, 1926.
W. MAYO
1,605,127
AUTOMOBILE TOP
Filed Oct. 9, 1923    2 Sheets-Sheet 1
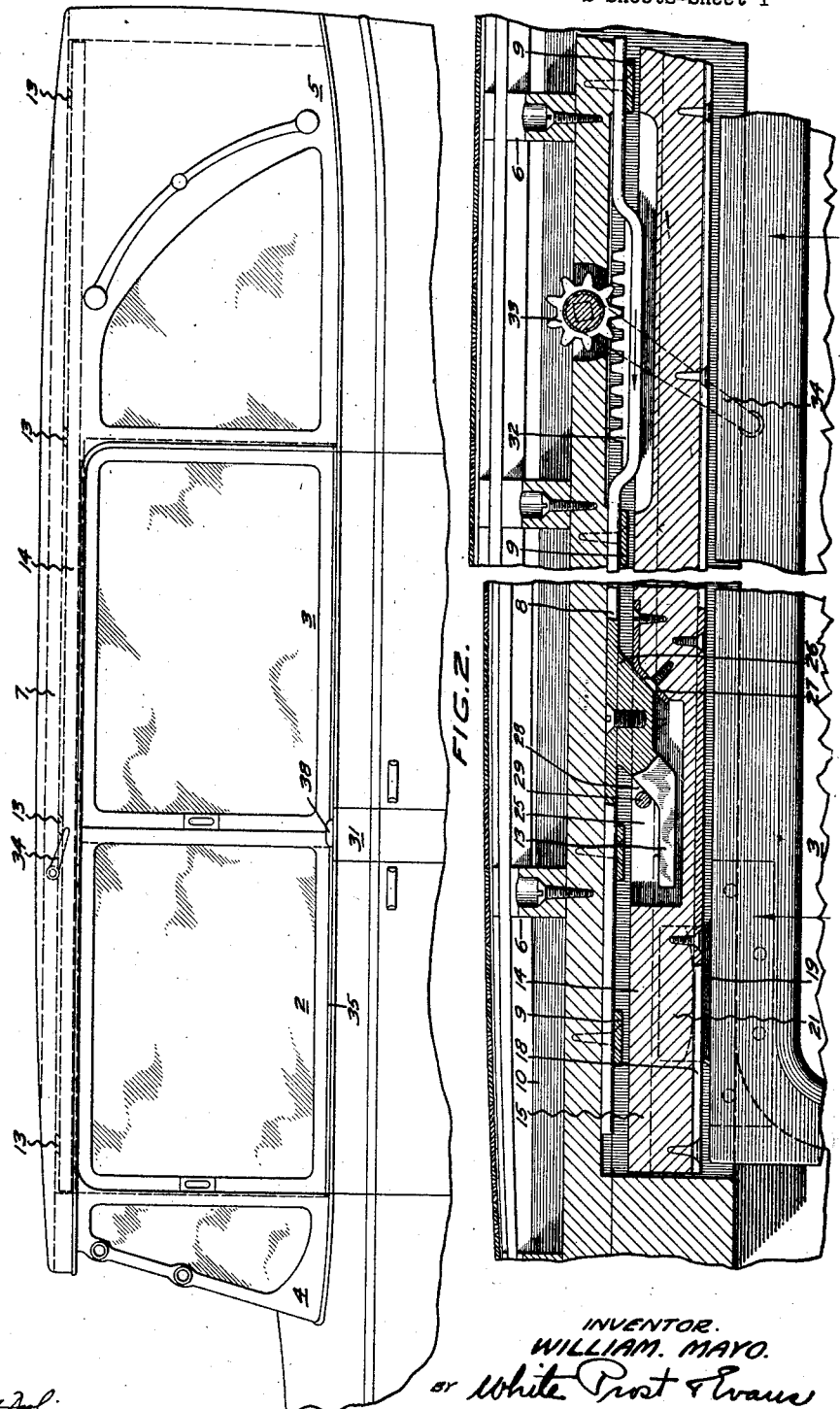
INVENTOR.
WILLIAM. MAYO.
BY White Prost & Evans
HIS ATTORNEYS.

Nov. 2, 1926.
W. MAYO
1,605,127
AUTOMOBILE TOP
Filed Oct. 9, 1923
2 Sheets-Sheet 2
FIG.3.
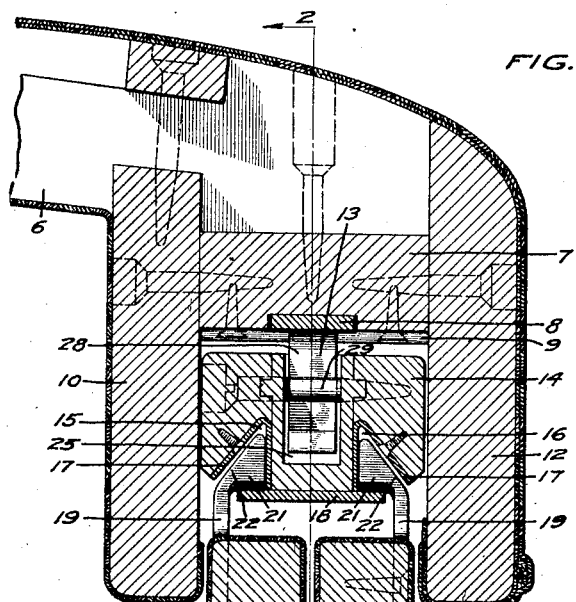
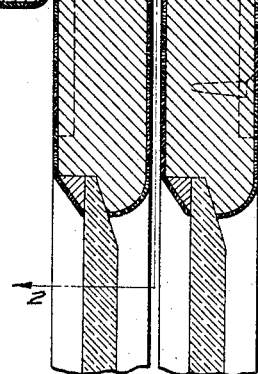
FIG.4.
FIG.5.
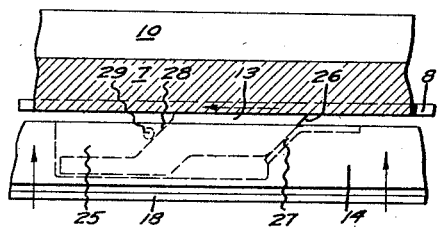
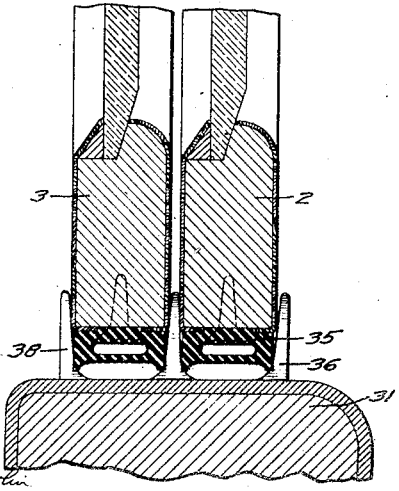
INVENTOR.
WILLIAM MAYO
BY White Prost Evans
HIS ATTORNEYS.

Patented Nov. 2, 1926.

1,605,127

UNITED STATES PATENT OFFICE.

WILLIAM MAYO, OF SAN FRANCISCO, CALIFORNIA.

AUTOMOBILE TOP.

Application filed October 9, 1923. Serial No. 667,490.

The invention relates to automobile tops of the sliding window type, which are used extensively to convert open cars to closed cars.

An object of the invention is to provide an automobile top of the sliding window type in which the sliding windows may be locked in any adjusted position.

Another object of the invention is to provide an automobile top of the sliding window type, which remains substantially rattle proof during the use of the automobile.

Another object of the invention is to provide an automobile top of the sliding window type, in which both of the windows on one side of the car may be simultaneously locked in any adjusted position or simultaneously released.

Another object of the invention is to provide means for producing a tight joint between the sliding window and the body to prevent rattling of the window.

The invention possesses other advantageous features, some of which, with the foregoing, will be set forth at length in the following description, where I shall outline in full, that form of my invention, which I have selected for illustration in the drawings accompanying and forming part of the present specification. In said drawings I have shown one form of automobile top embodying my invention, but it is to be understood that I do not limit myself to such form, since the invention, as set forth in the claims, may be embodied in a plurality of forms.

Referring to said drawings:—

Figure 1 is a side elevation of an automobile top embodying my invention.

Figure 2 is a longitudinal section through one side of the automobile top taken on the line 2—2 Figure 3, a portion of the structure being broken away to reduce the size of the figure.

Figure 3 is a vertical cross-section through one side of the automobile top showing two sliding windows.

Figure 4 is a detail illustrating the movement of the part to release the sliding windows.

Figure 5 is a detail illustrating the movement of the part to clamp the sliding windows.

The automobile top shown in the drawings is provided with two sliding windows 2 and 3, which, when in extended position, close the space between the front standard 4 and the rear fixed panel 5 of the automobile top. The panel 5 is of sufficient depth, so that when the windows 2 and 3 are moved backward, they may be contained within a pocket formed in the panel. Each window is slidable upon a separate trackway so that one window may be moved past the other and so that the windows may be placed in any desired adjusted position. It is understood that two windows are arranged on each side of the automobile and that each side is provided with a fixed panel 5 which serves as a housing to conceal the windows when they are moved backward to their furthest position. There is a trackway construction arranged at each side of the top and these trackway constructions are connected by the roof bows 6 which extend across the top.

Arranged at each side of the automobile top and suitably secured to the roof bows, is a side plate 7 which extends longitudinally for the length of the top. The side plate 7 is provided on its under surface with a groove in which there is disposed the longitudinal slide bar 8, movement of which serves to clamp or release the windows 2 and 3. The slide bar 8 is supported in the groove by cross straps 9 arranged at suitable intervals. Secured to, and extending below the side plate 7 on the inside of the top, is the inside top rail 10, and similarly arranged on the outside of the top is the outside top rail 12. These two rails are spaced apart by the side plate and extend below the side plate forming a longitudinal recess or groove in which the window hanging and locking structure is disposed.

The slide bar 8 is provided on its under surface, at suitable intervals, with fingers 13 having inclined surfaces which engage co-operating parts, during the movement of the slide bar, to lock or release the windows. Arranged below the side plate 7 is a longitudinally disposed window carrier 14 which extends substantially for the length of the top. This carrier 14 is preferably formed of wood and is provided on its under surface with longitudinally extending grooves 15 and 16 having metallic linings 17. Secured to the bottom of the window carrier is a rail 18 which partly overlies the grooves 15 and 16 and on which the sliding window hangers 19 are mounted. The hangers are provided with heads 21 which are disposed in the grooves and these heads are provided with inclined or bevelled surfaces 22 which lie adjacent similarly inclined or bevelled surface of the grooves. The heads are normally loosely disposed in the grooves but by moving the window carrier rail 14 downward with respect to the heads, the heads are wedged in the grooves, holding them tightly in place. Means are provided for raising and lowering the window carrier rail 14 to free or secure the hangers to the rail. The rail is provided on its upper surface with a plurality of sockets 25 in which the fingers 13 are disposed. The finger 13 is provided on its rear edge with an inclined surface 26 which co-operates with a similarly inclined surface 27 at the rear of the socket, so that as the finger 13 is moved backward the surface 26 rides over the surface 27, forcing the surface 27 and consequently the rail 14 downward. When the bar 8 is moved to its rearmost position, the finger rides up over the surface 27 and lies on the flat top surface of the rail 14 as shown in Figure 5, depressing the rail 14 to its maximum extent. The finger 13 is provided on its forward face with an inclined surface 28 which engages the cross pin 29 extending across the socket. This cross pin 29 may comprise the body of a screw as shown in Figure 3. As the bar 8 is moved forward the pin 29 rides up on the inclined surface 28 raising the rail 14 and consequently raising the windows. When the rail 14 is raised, the heads 21 of the window hangers are freed from wedging contact in the grooves in the rail and the lower edges of the windows are slightly raised from the body 31 of the automobile so that the windows may be readily shifted. When it is desired to lock the windows in adjusted position, the slide bar 8 is moved backward, lowering the rail 14, bringing the lower edges of the windows into contact with the body 31 and wedging the heads 21 of the hangers in the grooves in the rail.

Means are provided for moving the slide bar 8 forward and backward to release and secure the windows. At any suitable point in its length, the slide bar is provided with a rack 32 which is engaged by a gear 33 mounted on the top plates 10 and 12. Secured to the gear is a lever 34 arranged on the inside of the top and by moving this lever, the bar 8 is shifted to release or clamp the windows. It is to be understood that a lever 34 is arranged on each side of the top and that this lever may be placed in any desirable or convenient location.

The sliding windows 2 and 3 are provided along their bottom edges with conformable strips 35, usually formed of rather thick rubber, to form a cushion between the windows and the automobile body. These strips 35 are preferably provided on their under surfaces with longitudinally extending beads 36, so that the cushion more readily conforms itself when downward pressure is exerted on the window. The cushion also serves to form a tight joint between the window and the body to prevent rattle. I usually employ a short guide member 38 which is secured to the body at the juncture of the two windows, to form a guide for the lower edges of the sliding windows and to properly position the lower edges of the windows.

In accordance with my construction, the windows are free to slide when they are in the released condition and may be readily shifted. The lower edges of the windows are raised above the body and the hangers are free from the wedging surface of the rail 14 so that the windows are not restricted in their movement. When it is desired to lock the windows in adjusted position, the handle 34 is turned to force the rail 14 downward. This presses the lower edges of the windows firmly against the body, establishing a tight rattle-proof joint at that point and wedges the hangers tightly into the rail, establishing a tight rattle-proof joint at that place. The rail 14 fits snugly in the recess formed in the top and is held tightly in position against rattle by the fingers 13 on the slide bar. Thus when the windows are locked in position, all parts of the window supporting and locking structure are under tension so that no rattles may possibly develop.

I claim

1. In an automobile top, a longitudinally disposed side plate, a longitudinally movable bar carried by said side plate, a window carrying rail disposed below said bar, said rail being movable vertically, transversely disposed pins in said rail, fingers on said bar having inclined surfaces engaging said pins, whereby longitudinal movement of the bar produces vertical movement of the rail and sliding windows carried by the rail.

2. In an automobile top, a longitudinally disposed side plate, a longitudinally movable bar carried by said side plate, a rail disposed below said bar, said rail being movable vertically, transversely disposed pins in said rail, fingers on said bar having inclined surfaces engaging said pins, whereby longitudinal movement of the bar produces vertical movement of the rail, said rail being provided with a grooved lower surface, sliding window hangers carried by said rail and disposed in said groove, and a window secured to said hangers, the lower edge of the window lying adjacent the automobile body.

3. In an automobile top, a side plate, a longitudinally disposed window-carrying rail, sliding windows supported by said rail, a longitudinally slidable bar mounted in said side plate and arranged to support said window-carrying rail, means for sliding said bar and means interposed between said bar and rail whereby movement of the bar in one direction raises the windows and movement of the bar in the other direction depresses the windows.

In testimony whereof, I have hereunto set my hand.

WILLIAM MAYO.